Jan. 23, 1951  J. MASSINO  2,538,788
FISHING SIGNAL
Filed Aug. 21, 1945  2 Sheets-Sheet 1
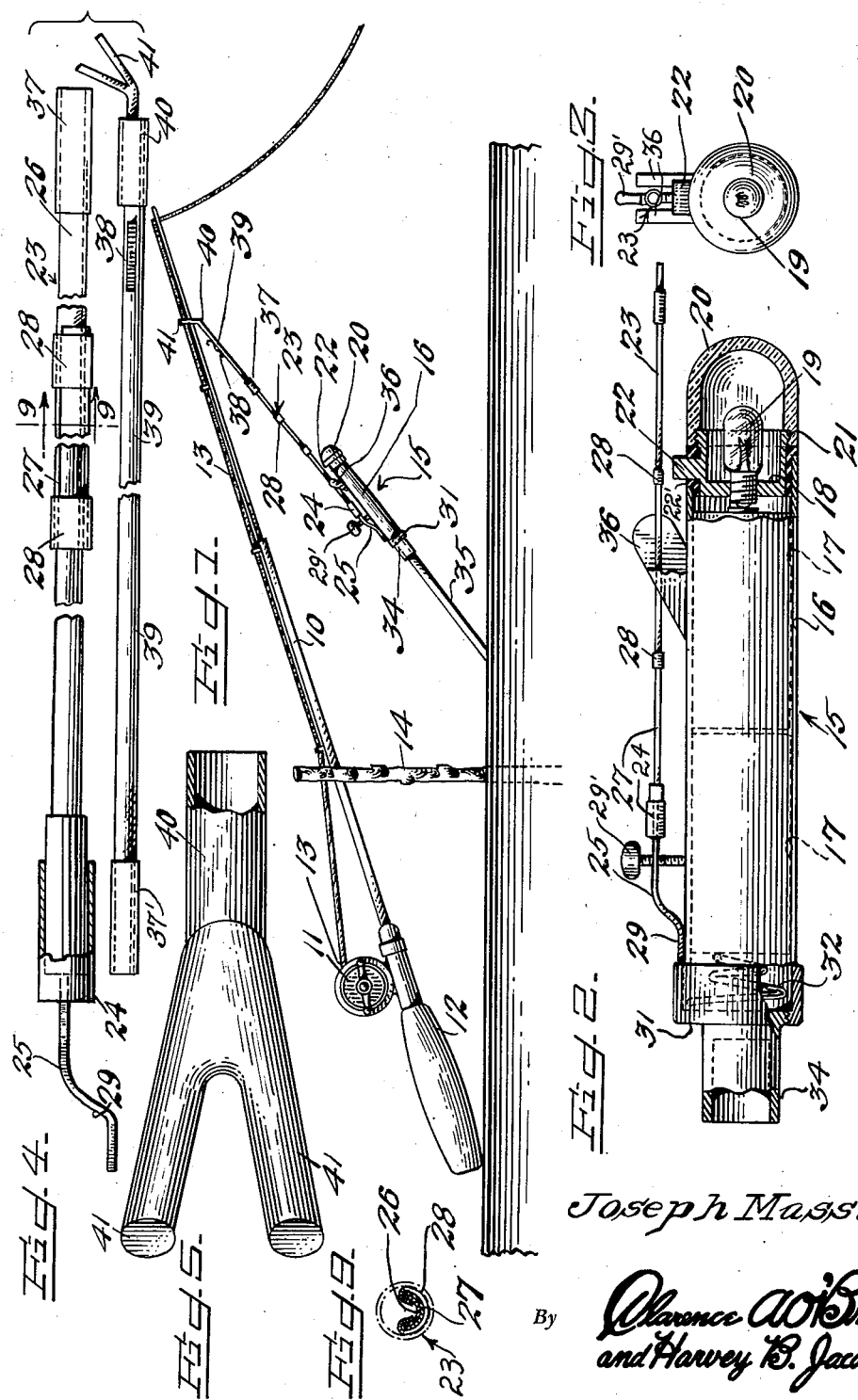
Inventor
Joseph Massino,
By Clarence A. O'Brien
and Harvey B. Jacobson
Attorneys Jan. 23, 1951  J. MASSINO  2,538,788
FISHING SIGNAL
Filed Aug. 21, 1945  2 Sheets-Sheet 2
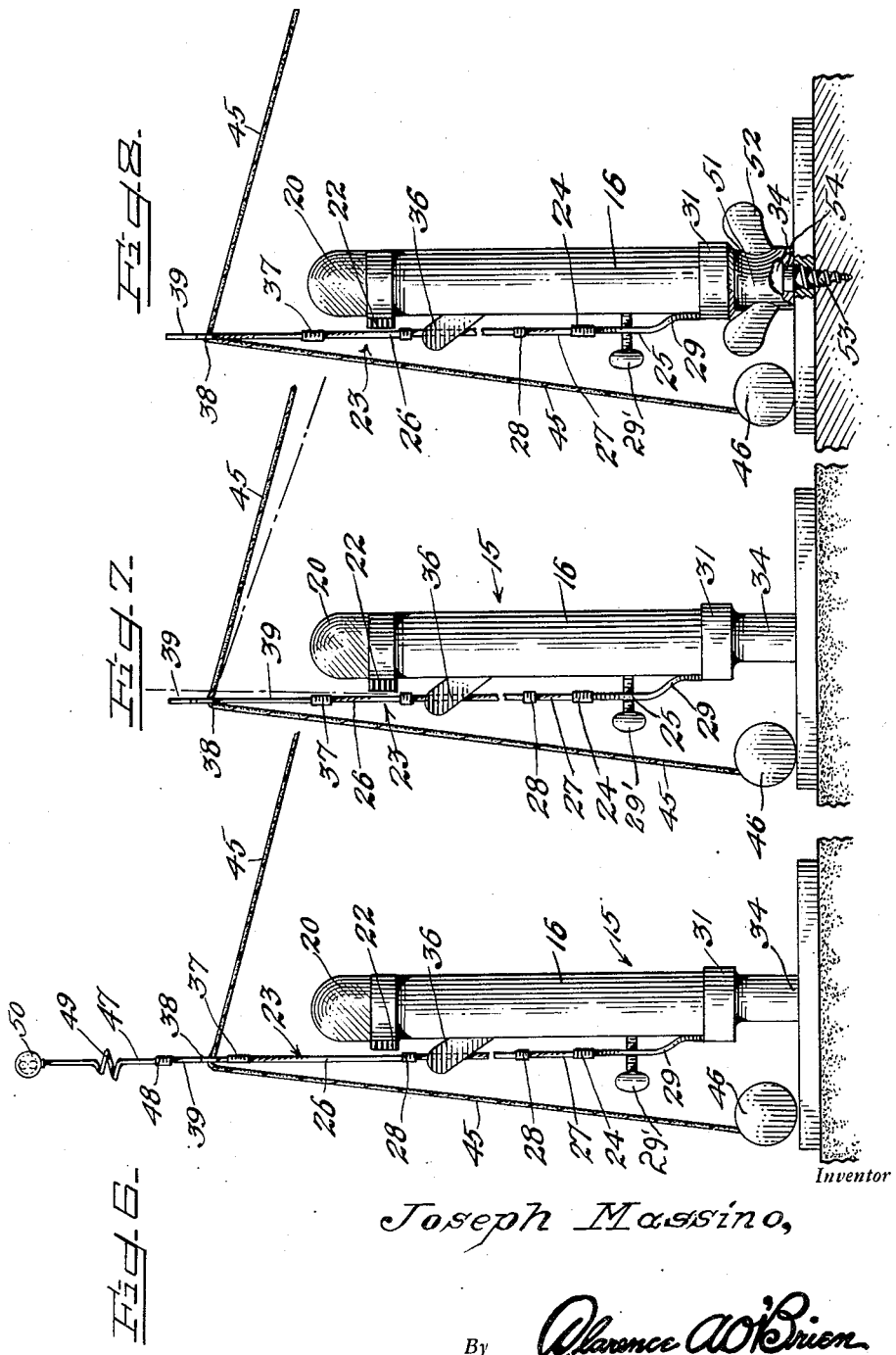
Inventor
Joseph Massino,
By Clarence A. O'Brien
and Harvey B. Jacobson
Attorneys Patented Jan. 23, 1951

2,538,788

UNITED STATES PATENT OFFICE 2,538,788

FISHING SIGNAL

Joseph Massino, Berwick, Pa.

Application August 21, 1945, Serial No. 611,805

1 Claim. (Cl. 43—17)

This invention relates to a fishing signal, and more particularly to such a signal adapted to be utilized with a fixed line, to indicate to the fisherman a bite on the line.

A primary object of this invention is the provision of an improved visual indicator adapted to illuminate a signal light when a fish strikes the line associated with the device.

An additional object of the invention is the provision of such a device adapted to be associated either with a fishing pole or a hand line, and characterized by a movable contact positioned adjacent a fixed contact, the arrangement being such that when a fish strikes the line the contacts are closed and the light illuminated.

A further and more specific object of the invention is the provision of such a device provided with interchangeable means whereby the same may be set in the ground, or secured to a wooden base such as the side of a boat, or a dock or pier or the like.

Still another object of the invention is the provision of a movable contact comprised of a metallic rod, and a plurality of attachments adapted to be associated with a tip of such contact rod whereby the device may be utilized under varying conditions in accordance with the type of fishing being done.

A further and more specific object of the invention is the provision of such a device wherein all the parts may be readily and simply interchanged as desired.

Further objects reside in the provision of such a device which will be sturdy and durable in construction, reliable and efficient in operation, and relatively simple and inexpensive to manufacture and assemble.

Other objects reside in the combinations of elements, arrangements of parts, and features of construction, all as will be more fully pointed out hereinafter and shown in the accompanying drawings, wherein there is disclosed a preferred embodiment of this inventive concept.

In the drawings wherein like reference characters denote like parts throughout the several views—

Figure 1 is a side elevational view of one form of the device embodying this inventive concept shown in association with a fishing pole and line therefor.

Figure 2 is an enlarged side view, partially in section and partially in elevation, disclosing constructional details of the visual indicator.

Figure 3 is an end elevational view of the device shown in Figure 2 as viewed from the right.

Figure 4 is an enlarged group view in elevation of a constructional detail, certain parts thereof being shown in section, and certain other parts being broken away.

Figure 5 is a fragmentary enlarged elevational view of a further constructional detail.

Figure 6 is a side elevational view of the device shown in Figure 2, certain auxiliary attachments being indicated thereon, shown as used with a hand line.

Figure 7 is a view similar to Figure 6 but disclosing the device in a different position of adjustment, as indicated by dotted lines, certain portions of the mechanism shown in Figure 6 being omitted.

Figure 8 is a view similar to Figures 6 and 7 but showing a different means for attaching or securing the device to a base, and Figure 9 is a sectional view taken substantially along the line 9—9 of Figure 4.

Having reference now to the drawings and more particularly to Figure 1, there is generally indicated at 10 a fishing pole, including a reel 11, a handle 12 and a line 13. The device is adapted to be supported at a suitable angle as by any convenient crutch 14, such as a forked stick or the like. The device of the instant invention generally indicated at 15, comprises a housing 16 as best shown in Figure 2, within which are adapted to be positioned batteries 17, and a light socket 18 containing a bulb 19. A transparent cover 20 is provided for the bulb 19 and threadedly engages suitable threads 21 on the socket 18. A metallic contact member 22, which may take the form of either a button or a peripheral ring about the socket is in electrical association with the socket, and is adapted to be engaged by a metallic contact member 23, to close the circuit to illuminate the bulb 19 in a manner to be more fully described hereinafter. Contact member 22 is insulated as at 22' from the casing or housing 16.

The member 23 which is channel-shaped in cross section, as best shown in Figure 9 is adapted to engage at one end in a ferrule 24, the opposite end of which is secured to an extending bracket 25. The opposite end of the bracket 25 is inwardly bent as at 29 and is secured as by soldering or the like to a point on casing 16 adjacent a cap member 31 adapted to close the end of the casing 16, and having positioned therewithin a compression spring 32. A thumb screw 29' extends through bracket 25 to permit adjustment of the position of contact member 23 with respect to housing 1, to compensate for variations in the current of the stream or like being fished. The member 23 is comprised of inner and outer sections 26 and 27 adapted to be secured together as by means of the channel shaped clips 28.

Secured to the outer end of the cap 31 is a ferrule 34, adapted to have positioned therein a rod 35, which may have a sharpened extremity adapted to be inserted in the ground as indicated in Figure 1.

Fins or guide members 36 are provided, preferably comprised of suitable insulating material, extending upwardly from the sides of the casing 16 on opposite sides of the member 23 in order to hold the same in alignment with the contact 22. As best shown in Figures 4 and 5 the extremity of the contact member 23 carries a socketed ferrule 37, which is adapted to receive a male member 37' at the extremity of a tip portion 39. In the use of the device as in Figure 1, the portion 39 is adapted to have positioned thereon the ferrule 40 of a bifurcated member or fork 41, the bifurcations serving to engage the fishing rod 10. A line securing clip 38 is secured at a suitable point on tip portion 39.

From the foregoing the operation of the device when utilized in the form above discussed should now be readily apparent. The parts are positioned as shown in Figure 1, with the fork 41 embracing the pole 10, and the contact 23 being spaced from the contact 22, suitable spacing being provided by the telescoping of sections 25 and 27 and adjustment of the thumb screw 29'. When a fish strikes the line, the pole 10 is drawn downwardly, which, through the fork 41 causes the contact member 23 to move downwardly, to engage the contact 22, thus closing the circuit through the batteries 17 to illuminate the bulb 19.

The device is particularly adapted for night fishing, and the arrangement is such that a fisherman need not constantly keep his eyes on a particular pole, nor need the body of water in which the fishing is being done be constantly illuminated. Obviously, as soon as a fish strikes a particular line, the light will be illuminated, either continuously or intermittently in accordance with the action of the fish, and the attention of the fisherman will be attracted thereto.

Having reference to Figure 6, the device is disclosed as adapted for use in conjunction with a hand line 45 carried by a reel 46. In this arrangement the device 15 is adapted to be positioned vertically in the ground, or the like, as by means of any suitable projection engaged by the ferrule 34, and the hand line 35 is passed through the clip 38 and extended outwardly into the body of water, the arrangement being such that the arm 23 is away from the contact 22 in a direction opposed to the positioning of the line. Obviously, when a fish strikes, the contact is moved in the direction of pull by the fish, and engages the contact 22 closing the circuit and illuminating the light. In Figure 7, the position of such movement is indicated by dotted lines. Referring back to Figure 6, an audible attachment may be supplied, in order to further attract the attention of the fisherman, and may take the form of a projecting rod 47 provided with a ferrule 48 adapted to be engaged over the tip portion 39, and having a coil 49 therein to provide added resiliency, a bell 50 being secured to the top of the device and adapted to be vibrated by the action of the fish in tugging on the line 45.

Referring particularly to Figure 8, there is disclosed an attachment for mounting the device on the gunwale of a boat or a dock or similar wooden surface, such means taking the form of a tubular member 51 adapted to fit over the ferrule 34, and provided with extending finger-grip portions 52. The member 51 is provided at its base with an aperture, of irregular configuration, preferably in the form of a polygon or rectangle, adapted to engage with a correspondingly formed head 54 of a wood screw 53, the arrangement being such that the screw 53 is free to drop out of the open end of the sleeve 51, when the same is removed from the ferrule 34. In this construction, obviously, the wood screw 53 may be caused to engage any suitable wooden surface, and the ferrule 34 is subsequently inserted in sleeve 51 for holding the device in the desired position in the gunwale of a boat or the like.

From the foregoing it will now be seen that there is herein provided an improved fishing signal, accomplishing all of the objects of this invention, and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A device of the character described adapted to be used with a fish line, including a tubular casing having a supporting ferrule on its inner end, supporting and affixing means detachably received in said ferrule, electric batteries in said casing, a socket in the outer end of said casing having a fixed switch contact formed thereon, a lamp bulb in said socket, a transparent cover lens therefor, spaced insulated guides on said casing, a movable sectional metal contact arm supported by said casing having contact with said electric batteries extending in spaced relation with said casing between said guides and forwardly of said casing terminating in a fishing rod supporting crotch at its outer end, fish line supporting means on the outer end of said movable metal contact arm, and a fish line supported by said last-mentioned means whereby a bite on said fish line will cause said movable metal contact arm to contact said fixed switch contact to close the circuit between said electric batteries and said bulb for illuminating the same to signal that there has been a bite on the fish line.

JOSEPH MASSINO.

REFERENCES CITED

The following references are of record in the file of this patent:

UNITED STATES PATENTS

| Number | Name | Date |
|---|---|---|
| 935,877 | Woesley et al. | Oct. 5, 1909 |
| 989,145 | Hatchett | Apr. 11, 1911 |
| 1,082,475 | Orswell | Dec. 23, 1913 |
| 1,337,292 | Timmons | Apr. 20, 1920 |
| 1,577,612 | Dees | Mar. 23, 1926 |
| 1,752,397 | See | Apr. 1, 1930 |
| 2,195,692 | Bushey | Apr. 2, 1940 |
| 2,200,995 | Procter | May 14, 1940 |
| 2,354,279 | Ross | July 25, 1944 |

FOREIGN PATENTS

| Number | Country | Date |
|---|---|---|
| 439,732 | Great Britain | Dec. 12, 1935 |
| 609,633 | Germany | Feb. 19, 1935 |